US012540628B1

(12) United States Patent
Duong (10) Patent No.: US 12,540,628 B1
(45) Date of Patent: Feb. 3, 2026

(54) IMPELLER BLADE TURNING DISTRIBUTION

(71) Applicant: Pratt & Whitney Canada Corp., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/282,771

(22) Filed: Jul. 28, 2025

(51) Int. Cl.
| F04D 29/30 | (2006.01) |
| F04D 17/10 | (2006.01) |
| F04D 29/28 | (2006.01) |
| F04D 29/42 | (2006.01) |

(52) U.S. Cl.
CPC ............. *F04D 29/30* (2013.01); *F04D 17/10* (2013.01); *F04D 29/284* (2013.01); *F04D 29/4206* (2013.01); *F05D 2220/323* (2013.01); *F05D 2240/304* (2013.01)

(58) Field of Classification Search
CPC .............. F04D 29/30; F05D 2240/303; F05D 2240/304
See application file for complete search history.

(56) References Cited

U.S. PATENT DOCUMENTS

| 3,904,312 | A | | 9/1975 | Exley |
| 5,685,696 | A | * | 11/1997 | Zangeneh ............. F04D 29/284 416/186 R |
| 8,475,131 | B2 | * | 7/2013 | Shibata ................. F04D 29/284 416/182 |
| 10,125,773 | B2 | | 11/2018 | Hiradate et al. |
| 11,811,108 | B2 | * | 11/2023 | Umeyama .......... H01M 8/04111 |
| 2009/0035122 | A1 | * | 2/2009 | Yagi ........................ F04D 29/30 416/223 R |

FOREIGN PATENT DOCUMENTS

| JP | 6034162 B2 | 11/2016 |
| WO | 2023248534 A1 | 12/2023 |

* cited by examiner

*Primary Examiner* — Brian O Peters
(74) *Attorney, Agent, or Firm* — CANTOR COLBURN LLP (57) ABSTRACT

An impeller of an aircraft gas turbine engine is provided. The impeller includes a hub, blades and a shroud surrounding the hub and the blades to form a flow path from an inducer portion at an upstream side of the impeller to an exducer portion at an impeller exit. At least one of the blades includes a leading edge and a trailing edge with an exit angle at the impeller exit. The at least one of the blades exhibits an overturning peak and a blade turning angle. The blade turning angle minimizes blade loading and is adjusted rapidly from the overturning peak to the exit angle at the trailing edge.

20 Claims, 7 Drawing Sheets

IMPELLER BLADE TURNING DISTRIBUTION

BACKGROUND

Exemplary embodiments of the present disclosure relate generally to impellers and, in some embodiments, to an impeller of a centrifugal compressor of a gas turbine engine of an aircraft engine that exhibits an impeller blade turning distribution.

Centrifugal compressors are widely used in aerospace and industrial applications. An impeller of a centrifugal compressor can generate large increases in the total pressure of a working fluid by way of a radius change from the inlet of the impeller to the exit of the impeller. A diffuser is typically arranged downstream from the exit of the impeller and is used to convert kinetic energy from the impeller in the form of a velocity of the working fluid to potential energy in the form of static pressure of the working fluid. Diffuser performance is often strongly affected by impeller exit conditions.

BRIEF DESCRIPTION

According to an aspect of the disclosure, an impeller of an aircraft gas turbine engine is provided. The impeller includes a hub, blades and a shroud surrounding the hub and the blades to form a flow path from an inducer portion at an upstream side of the impeller to an exducer portion at an impeller exit. At least one of the blades includes a leading edge and a trailing edge with an exit angle at the impeller exit. The at least one of the blades exhibits an overturning peak and a blade turning angle. The blade turning angle minimizes blade loading and is adjusted rapidly from the overturning peak to the exit angle at the trailing edge.

In accordance with at least one or more additional and/or alternative embodiments, the at least one of the blades is at least one of a main blade and a splitter blade interposed between neighboring main blades.

In accordance with at least one or more additional and/or alternative embodiments, an adjustment of the blade turning angle is made over half an overturning length.

In accordance with at least one or more additional and/or alternative embodiments, an adjustment of the blade turning angle is made over half an overturning length within a range of 25%<C/L<50%.

In accordance with at least one or more additional and/or alternative embodiments, the blade turning angle is decreased from the overturning peak at around 60-65% M to the trailing edge with a significant Beta angle decrease from the overturning point to about 90% M and a flattening of the Beta angle from about 90% M to the trailing edge, wherein M is a meridional length of the at least one of the blades.

In accordance with at least one or more additional and/or alternative embodiments, the blade turning angle falls below the exit angle.

In accordance with at least one or more additional and/or alternative embodiments, the blade turning angle falls below the exit angle by about five degrees.

In accordance with at least one or more additional and/or alternative embodiments, the blade turning angle is decreased from the overturning peak at around 60-65% M to the trailing edge with a significant Beta angle decrease from the overturning point to about 90% M, where the Beta angle is less than the exit Beta angle by about 5 degrees, and an increase of the Beta angle from about 90% M to the trailing edge, wherein M is a meridional length of the at least one of the blades.

According to an aspect of the disclosure, an impeller of an aircraft gas turbine engine is provided and includes a hub, blades and a shroud surrounding the hub and the blades to form a flow path from an inducer portion at an upstream side of the impeller to an exducer portion at an impeller exit. Each blade includes a leading edge and a trailing edge with an exit angle at the impeller exit. Each blade exhibits an overturning peak and a blade turning angle. For each blade, the blade turning angle minimizes blade loading and is adjusted rapidly from the overturning peak to the exit angle at the trailing edge.

In accordance with at least one or more additional and/or alternative embodiments, an adjustment of the blade turning angle is made over half an overturning length within a range of 25%<C/L<50%.

In accordance with at least one or more additional and/or alternative embodiments, the blade turning angle is decreased from the overturning peak at around 60-65% M to the trailing edge with a significant Beta angle decrease from the overturning point to about 90% M and a flattening of the Beta angle from about 90% M to the trailing edge, wherein M is a meridional length of each of the blades.

In accordance with at least one or more additional and/or alternative embodiments, the blade turning angle falls below the exit angle.

In accordance with at least one or more additional and/or alternative embodiments, the blade turning angle falls below the exit angle by about five degrees.

In accordance with at least one or more additional and/or alternative embodiments, the blade turning angle is decreased from the overturning peak at around 60-65% M to the trailing edge with a significant Beta angle decrease from the overturning point to about 90% M, where the Beta angle is less than the exit Beta angle by about 5 degrees, and an increase of the Beta angle from about 90% M to the trailing edge, wherein M is a meridional length of each of the blades.

According to an aspect of the disclosure, an impeller of an aircraft gas turbine engine is provided and includes a hub, blades and a shroud surrounding the hub and the blades to form a flow path from an inducer portion at an upstream side of the impeller to an exducer portion at an impeller exit. The blades include main blades and splitter blades interposed between neighboring main blades. Each of the main blades and each of the splitter blades includes a leading edge and a trailing edge with an exit angle at the impeller exit. Each of the main blades and each of the splitter blades exhibits an overturning peak and a blade turning angle. For each of the main blades and for each of the splitter blades, the blade turning angle minimizes blade loading and is adjusted rapidly from the overturning peak to the exit angle at the trailing edge.

In accordance with at least one or more additional and/or alternative embodiments, an adjustment of the blade turning angle is made over half an overturning length within a range of 25%<C/L<50%.

In accordance with at least one or more additional and/or alternative embodiments, the blade turning angle is decreased from the overturning peak at around 60-65% M to the trailing edge with a significant Beta angle decrease from the overturning point to about 90% M and a flattening of the Beta angle from about 90% M to the trailing edge, wherein M is a meridional length of each of the main blades and each of the splitter blades.

In accordance with at least one or more additional and/or alternative embodiments, the blade turning angle falls below the exit angle.

In accordance with at least one or more additional and/or alternative embodiments, the blade turning angle falls below the exit angle by about five degrees.

In accordance with at least one or more additional and/or alternative embodiments, the blade turning angle is decreased from the overturning peak at around 60-65% M to the trailing edge with a significant Beta angle decrease from the overturning point to about 90% M, where the Beta angle is less than the exit Beta angle by about 5 degrees, and an increase of the Beta angle from about 90% M to the trailing edge, wherein M is a meridional length of each of the main blades and each of the splitter blades.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
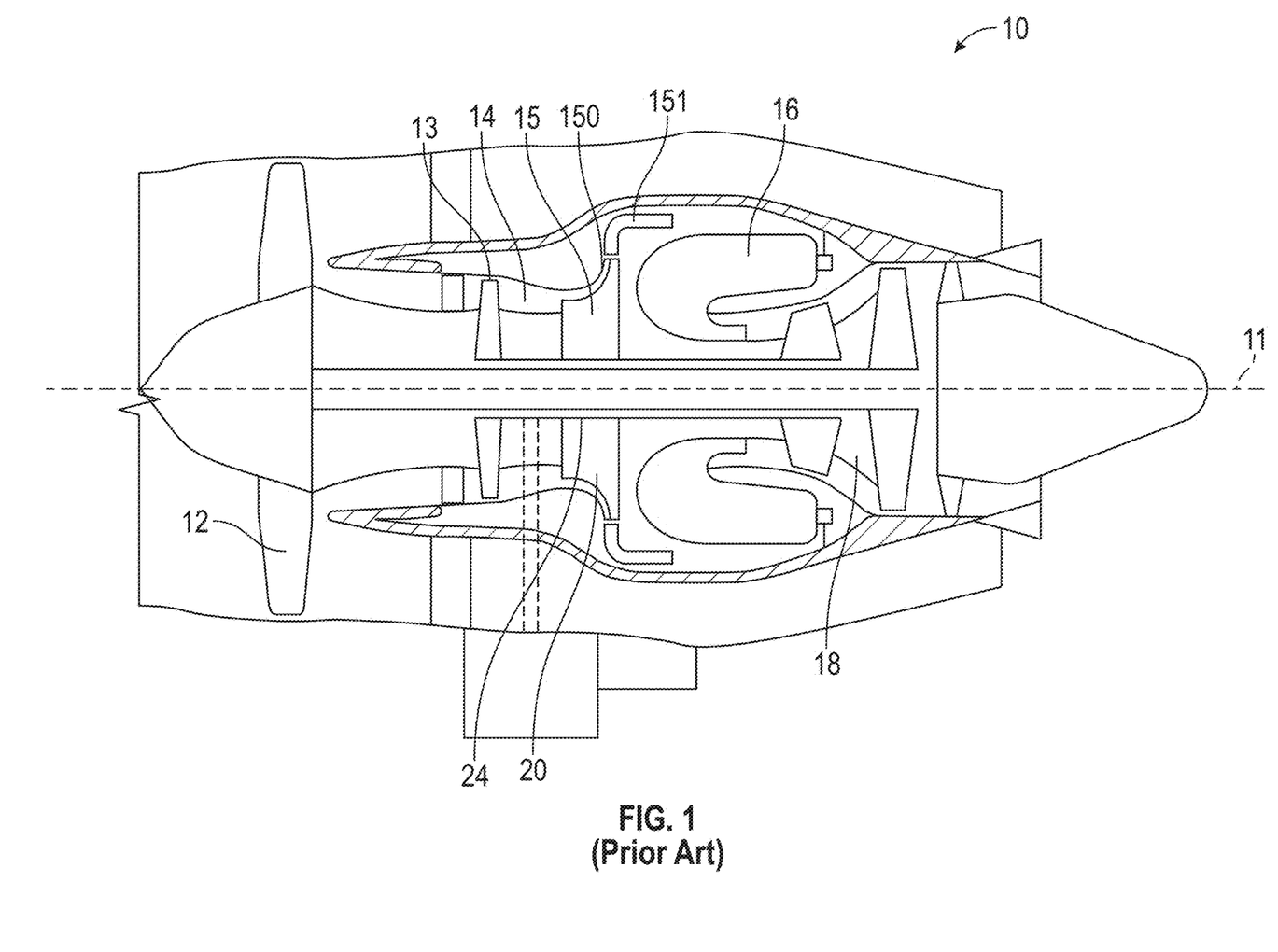
FIG. 1 is a schematic cross-sectional view of a prior art gas turbine engine in accordance with embodiments.
Figure 2:
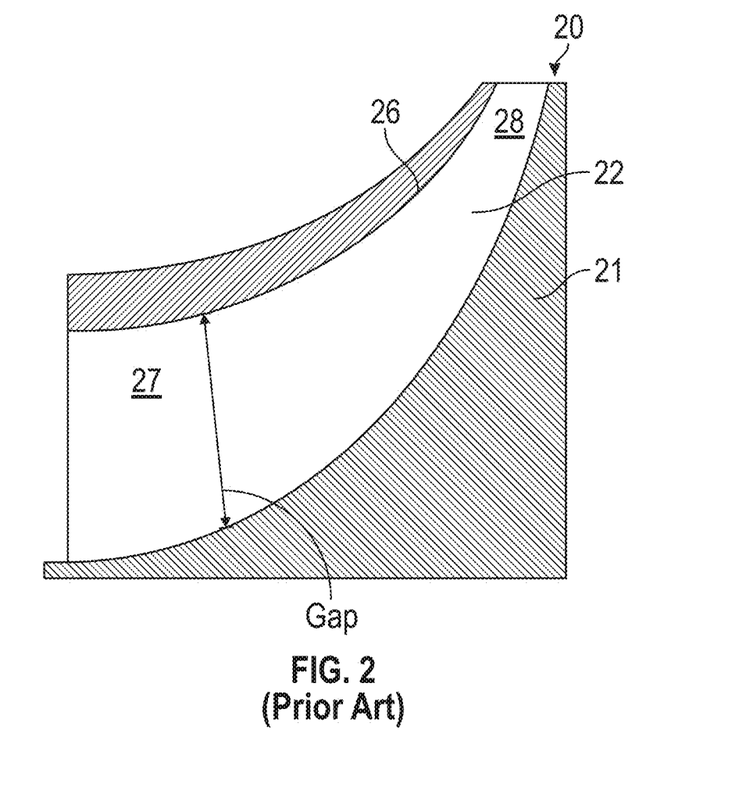
FIG. 2 is a schematic cross-sectional view of a prior art impeller in accordance with embodiments.

FIGS. 1 and 2 illustrate a prior art turbofan gas turbine engine 10 of a type preferably provided for use in subsonic flight of an aircraft and a prior art impeller 20.

The gas turbine engine 10 generally includes in serial flow communication a fan 12 through which ambient air is propelled, a multistage high-pressure compressor (HPC) 14 for pressurizing the air having an axial compressor 13 and a centrifugal compressor 15, an impeller shroud 150, a diffuser 151, a combustor 16 and a turbine section 18. The impeller shroud 150 is adjacent to the centrifugal compressor 15 and forms a fluid flow path for air being compressed with the centrifugal compressor 15. The diffuser 151 is downstream from the centrifugal compressor 15 and directs compressed air from the centrifugal compressor 15 to the combustor 16. The compressed air is mixed with fuel and ignited is the combustor 16 for generating an annular stream of hot combustion gases. The turbine section 18 is configured to extract energy from the combustion gases. The center axis 11 of the engine 10 is also illustrated.

The centrifugal compressor 15 axially receives a compressible fluid, increases the pressure of the compressible fluid and conveys it in a substantially radial direction. The working or compressible fluid can be any fluid which can experience significant variations in density and in most instances is air or another gas. The centrifugal compressor 15 includes at least an impeller 20, which increases the pressure of the compressible fluid before conveying it downstream and the impeller shroud 150, which houses the impeller 20 and provides structure to the centrifugal compressor 15.

The impeller 20 can be any device which can rotate about a central axis so as to increase the pressure of the compressible fluid. The impeller 20 has an impeller hub 21 and multiple impeller blades 22 extending from the impeller hub 21. The impeller 20 is mounted to a shaft 24 which rotates, along with the impeller 20, about a shaft axis that can be coaxial with center axis 11. The impeller shroud 150 houses or encloses the impeller 20 and includes a shroud body, which provides the impeller shroud 150 with structure and an ability to resist loads generated by the centrifugal compressor 15 when in operation. The impeller shroud 150 also has a shroud surface 26, which is exposed to the compressible fluid and which surrounds the impeller blades 22. The shroud surface 26 and the impeller hub 21 respectively extend between an inducer portion 27 and an exducer portion 28.

In an impeller, such as the impeller 20 of FIGS. 1 and 2, as flow navigates around a knee of the impeller, the flow tends to separate due to high curvatures and elevated Mach numbers. This flow separation further develops into a high-loss region in the exducer area (i.e., the exducer portion 28 of FIG. 2) when the flow encounters a region of high-pressure gradients, located on the pressure side of the impeller near the trailing edge. In greater detail, in a typical impeller, there are essentially two regions of flow separation accumulation on the pressure sides of both the main blades and the splitter blades. As the flow slows down at the shroud around the knee region, the boundary layer begins to build up. When this low-momentum flow turns radially toward the exit, it cannot overcome the adverse pressure on the impeller's pressure side, leading to flow breakdown. Moreover, due to beta distribution for the shroud section indicating that overturning occurs past the trailing edge blade angle at approximately 70% of the chord, diffusion in a typical impeller occurs up to 70% of the chord.

Thus, as will be described below, an impeller blade design is proposed. The impeller blade design incorporates a turning feature. This turning feature effectively reduces pressure gradients at a trailing edge of a pressure side of the impeller blade. This prevents or at least minimizes accumulations of high-pressure losses.

Figure 3A:
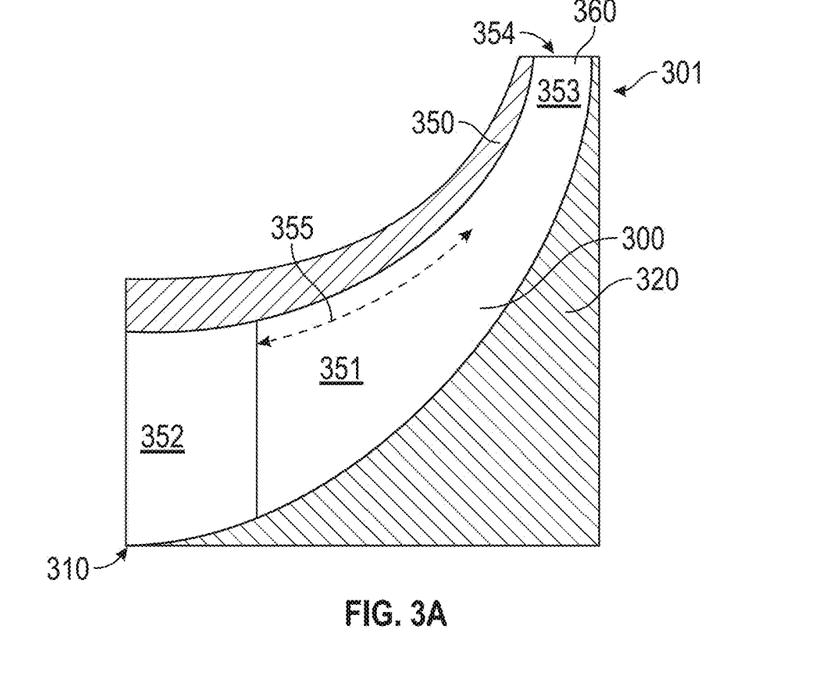
FIGS. 3A and 3B are side and perspective views of an impeller in accordance with embodiments.
Figure 3B:
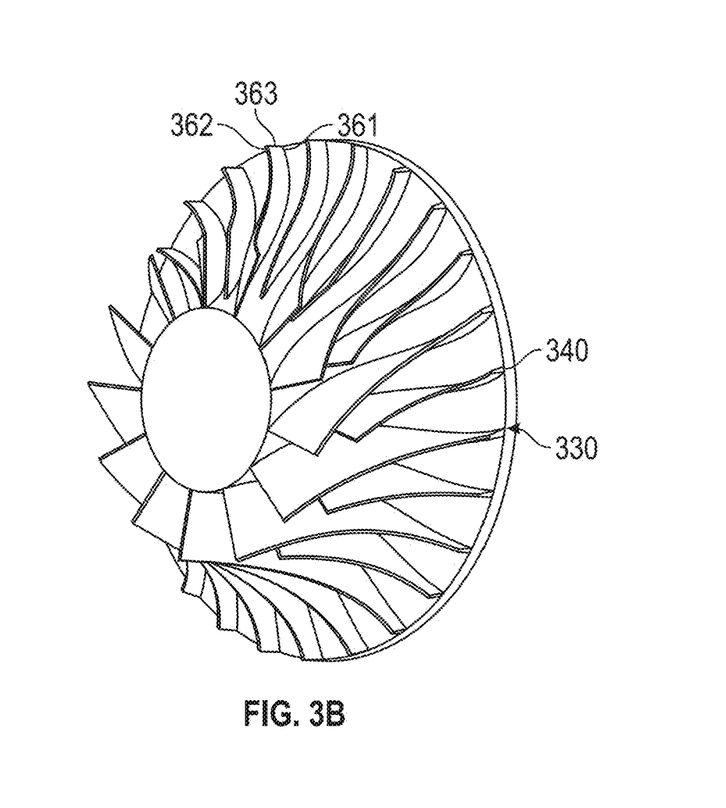

With continued reference to FIGS. 1 and 2 and with additional reference to FIGS. 3A and 3B, a centrifugal compressor 301 of an aircraft gas turbine engine, such as the centrifugal compressor 15 of the gas turbine engine 10 of FIG. 1, is provided. The centrifugal compressor 301 includes an impeller 310. The impeller 310 includes an impeller hub 320, impeller main blades 330, impeller splitter blades 340 and an impeller shroud 350. The impeller shroud 350 surrounds the impeller hub 320 and surrounds the impeller main blades 330 and the impeller splitter blades 340 to form a flow path 351 from an inducer portion 352 at an upstream side of the impeller 310 to an exducer portion 353 at an impeller exit 354. It is to be understood that the impeller splitter blades 340 are not required, however, and that embodiments exist in which the impeller 310 includes only impeller main blades 330. The following description will relate to the cases in which the impeller 310 includes both impeller main blades 330 and impeller splitter blades 340 for purposes of clarity and brevity.

The impeller main blades 330 extend from the inducer portion 352 to the exducer portion 353. The impeller splitter blades 340 are interleaved with the impeller main blades 330 and extend to the exducer portion 353 from an impeller mid-point. In accordance with embodiments, the impeller mid-point can be defined as an impeller knee 355, which is interposed between the inducer portion 352 and the exducer portion 353 and which is characterized as being a range of locations where the flow path 351 changes from a predominantly axial direction to a predominantly radial direction.

Each of the impeller main blades 330 includes, at the impeller exit 354, a trailing edge 360. The trailing edge 360 of one or more of the impeller main blades 330 includes a hub-side trailing edge portion 361 proximate to or adjacent to the impeller hub 320, a shroud-side trailing edge portion 362 proximate to and displaced from the impeller shroud 350 and a central trailing edge portion 363 that is interposed between the hub-side trailing edge portion 361 and the shroud-side trailing edge portion 362.

Figure 4:
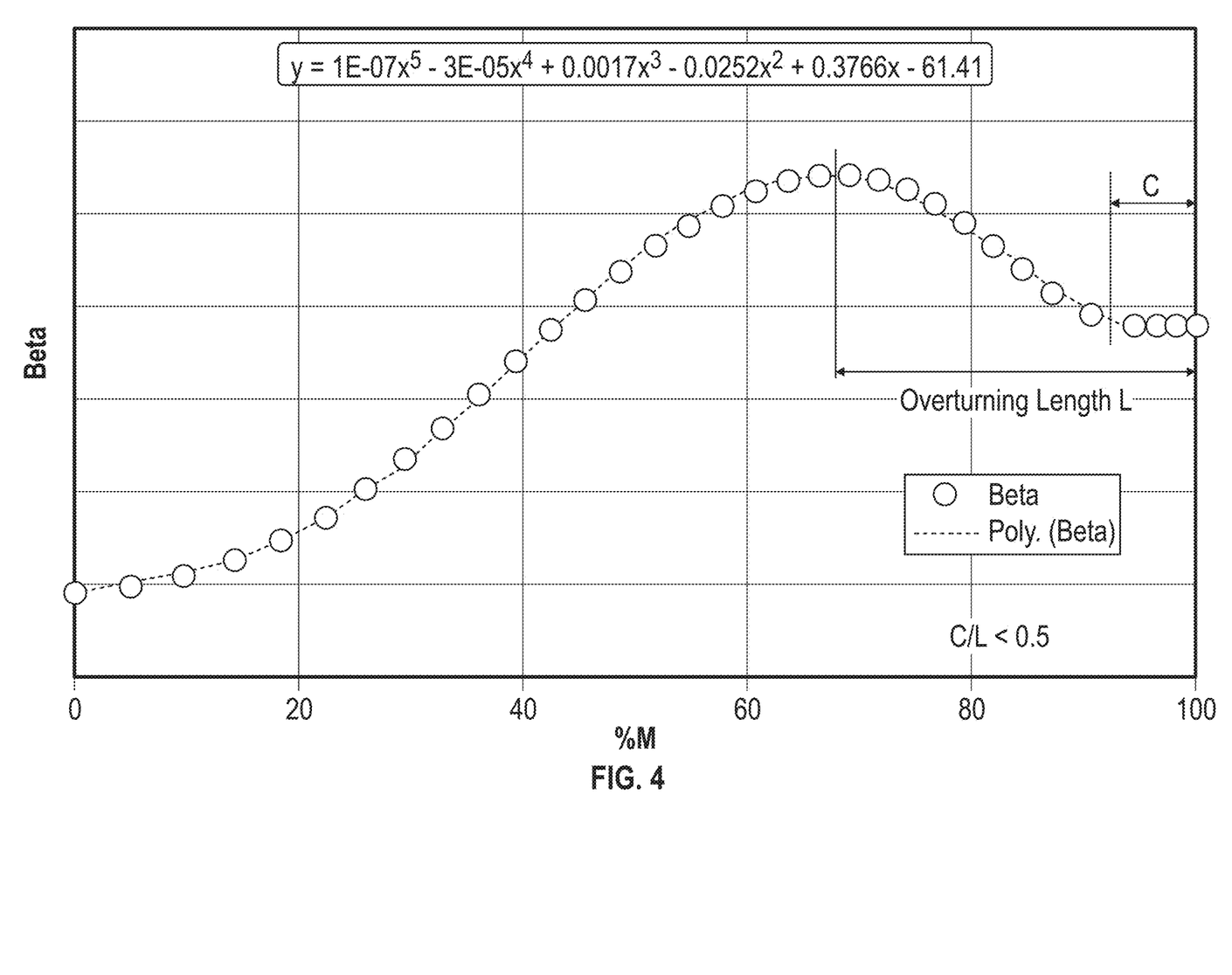
FIG. 4 is a graphical depiction of Beta angle distribution of an impeller blade in accordance with embodiments.
Figure 5:
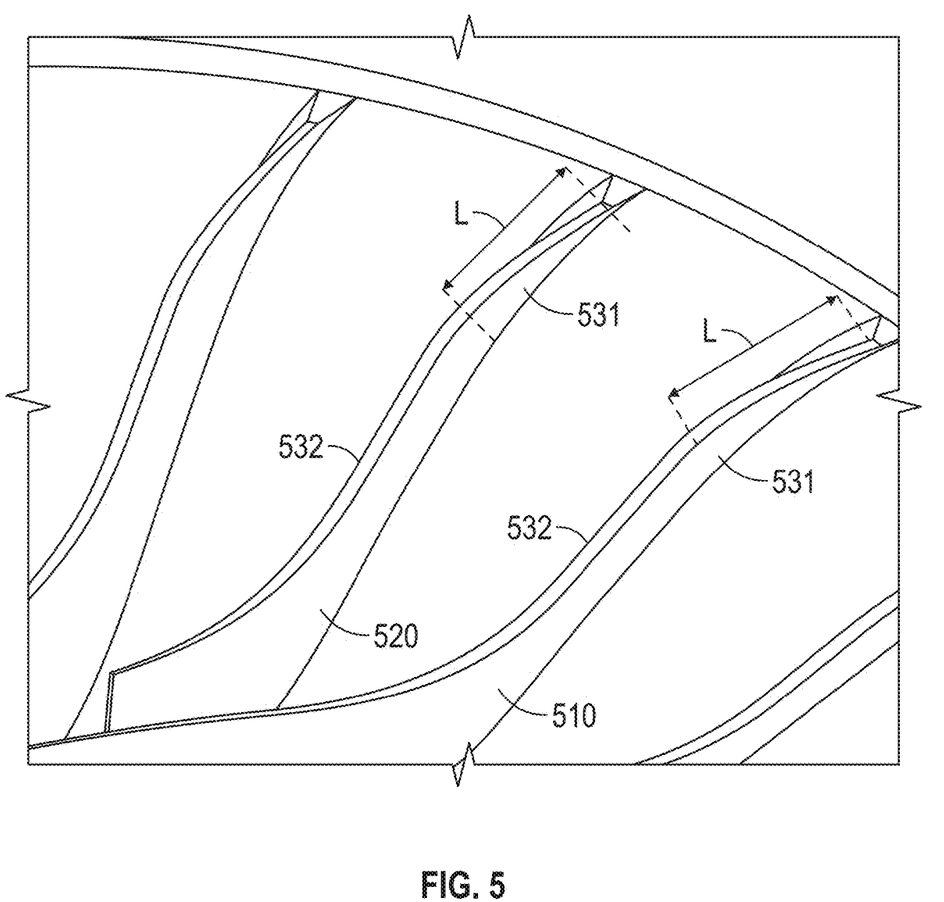
FIG. 5 is a perspective view of impeller blades exhibiting the Beta angle distribution of FIG. 4 in accordance with embodiments.
Figure 6:
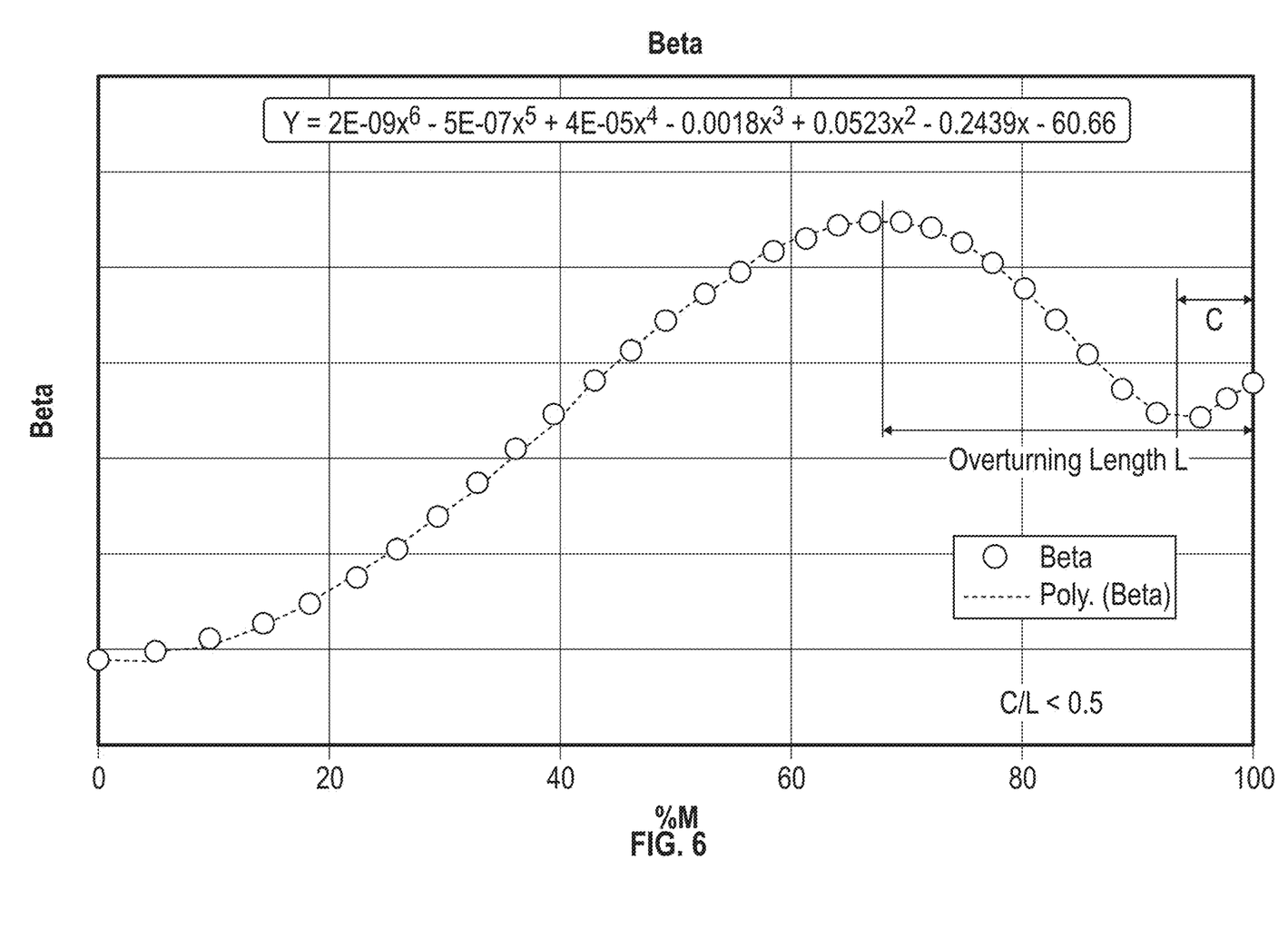
FIG. 6 is a graphical depiction of Beta angle distribution of an impeller blade where the Beta angle falls below an exit angle in accordance with embodiments.
Figure 7:
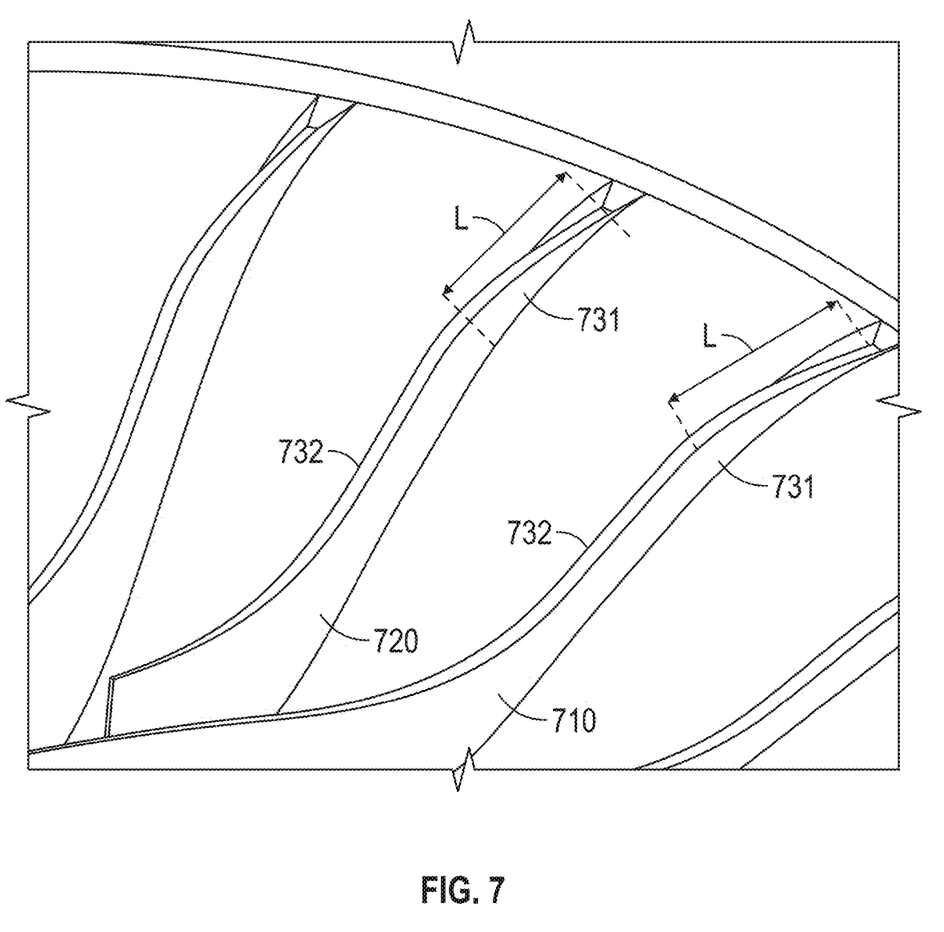
FIG. 7 is a perspective view of impeller blades exhibiting the Beta angle distribution of FIG. 6 in accordance with embodiments.

With continued reference to FIGS. 3A and 3B and with additional reference to FIGS. 4 and 5 and to FIGS. 6 and 7, a new blade surface turning angle, denoted as Beta or Beta angle, is provided. As shown in FIGS. 4 and 5, in order to minimize blade loading, the blade surface turning angle Beta is adjusted more rapidly back to the exit blade angle after reaching peak overturning. This adjustment can be made over half the length L, specifically within the range of 25%<C/L<50%, where C represents the distance at which the exit Beta angle aligns with the exit angle. In certain scenarios, as shown in FIGS. 6 and 7, the distribution may fall below the exit Beta angle if additional unloading is desired.

In greater detail and as shown cooperatively in FIGS. 4 and 5, an impeller 500 is provided with main impeller blades 510 and splitter blades 520, which are each interposed between a pair of neighboring main impeller blades 510. Each of the main impeller blades 510 and each of the splitter blades 520 includes a suction side 531 and a pressure side 532. In both the baseline configuration and the current configuration, a blade thickness between the pressure side 532 and the suction side 531 is uniform. However, in the current configuration, the pressure side 532 is shifted at different points from the baseline configuration whereby the new blade design can be characterized as tilting from the suction side 531 towards the pressure side 532 because of the alteration in the Beta angle and the corresponding rapid adjustment of the Beta angle distribution graphically displayed in FIG. 4.

The rapid Beta angle adjustment in this case occurs from the overturning point at around 60-65% M (i.e., 60-65% of the meridional length of the main impeller blades 510 or the splitter blades 520) to the trailing edge with a significant Beta angle decrease from the overturning point to about 90% M and a flattening of the Beta angle from about 90% M to the trailing edge.

As shown in FIG. 4, the rapid Beta angle adjustment can be expressed as a polynomial function as follows:

$$Y=1E\text{-}07x^5-3E\text{-}05x^4+0.0017x^3-0.0252x^2+0.3766x-61.41,$$

where Y is the Beta angle and x is the % M.

In greater detail and as shown cooperatively in FIGS. 6 and 7, an impeller 700 is provided with main impeller blades 710 and splitter blades 720, which are each interposed between a pair of neighboring main impeller blades 710. Each of the main impeller blades 710 and each of the splitter blades 720 includes a suction side 731 and a pressure side 732. In both the baseline configuration and the current configuration, a blade thickness between the pressure side 732 and the suction side 731 is uniform. However, in the current configuration, the pressure side 732 is shifted at different points from the baseline configuration whereby the new blade design can be characterized as tilting from the suction side 731 towards the pressure side 732 because of the alteration in the Beta angle and the corresponding rapid adjustment of the Beta angle distribution graphically displayed in FIG. 6.

The rapid Beta angle adjustment in this case occurs from the overturning point at around 60-65% M (i.e., 60-65% of the meridional length of the main impeller blades 710 or the splitter blades 720) to the trailing edge with a significant Beta angle decrease from the overturning point to about 90% M, where the Beta angle is less than the exit Beta angle by about 5 degrees, and an increase of the Beta angle from about 90% M to the trailing edge.

As shown in FIG. 6, the rapid Beta angle adjustment can be expressed as a polynomial function as follows:

$$Y=2E\text{-}09x^6-5E\text{-}07x^5+4E\text{-}05x^4-0.0018x^3+0.0523x^2-0.2439x-60.66,$$

where Y is the Beta angle and x is the % M.

Technical effects and benefits of the features described herein are the provision of an impeller of a centrifugal compressor that incorporates a turning feature, which reduces the pressure gradient at the trailing edge of the pressure side of the impeller blade. This prevents or at least minimizes the accumulation of high-pressure losses.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An impeller of an aircraft gas turbine engine, the impeller comprising: a hub; blades; and a shroud surrounding the hub and the blades to form a flow path from an inducer portion at an upstream side of the impeller to an exducer portion at an impeller exit, at least one of the blades comprising: a leading edge; and a trailing edge with an exit angle at the impeller exit, and the at least one of the blades exhibiting an overturning peak and a blade turning angle, wherein the blade turning angle beta minimizes blade loading and is adjusted from the overturning peak to the exit angle at the trailing edge according to one of the following equations:

$$\text{Beta}=1E\text{-}07x^5-3E\text{-}05x^4+0.0017x^3-0.0252x^2+0.3766x-61.41, \text{ or}$$

$$\text{Beta}=2E\text{-}09x^6-5E\text{-}07x^5+4E\text{-}05x^4-0.0018x^3+0.0523x^2-0.2439x-60.66.$$

2. The impeller according to claim 1, wherein the at least one of the blades is at least one of a main blade and a splitter blade interposed between neighboring main blades.

3. The impeller according to claim 1, wherein an adjustment of the blade turning angle is made over half an overturning length.

4. The impeller according to claim 1, wherein an adjustment of the blade turning angle is made over half an overturning length within a range of 25%<C/L<50%.

5. The impeller according to claim 1, wherein the blade turning angle is decreased from the overturning peak at around 60-65% M to the trailing edge with a significant Beta angle decrease from the overturning point to about 90% M and a flattening of the Beta angle from about 90% M to the trailing edge, wherein M is a meridional length of the at least one of the blades.

6. The impeller according to claim 1, wherein the blade turning angle falls below the exit angle.

7. The impeller according to claim 1, wherein the blade turning angle falls below the exit angle by about five degrees.

8. The impeller according to claim 1, wherein the blade turning angle is decreased from the overturning peak at around 60-65% M to the trailing edge with a significant Beta angle decrease from the overturning point to about 90% M, where the Beta angle is less than the exit Beta angle by about 5 degrees, and an increase of the Beta angle from about 90% M to the trailing edge, wherein M is a meridional length of the at least one of the blades.

9. An impeller of an aircraft gas turbine engine, the impeller comprising: a hub; blades; and a shroud surrounding the hub and the blades to form a flow path from an inducer portion at an upstream side of the impeller to an exducer portion at an impeller exit, each blade comprising: a leading edge; and a trailing edge with an exit angle at the impeller exit, and each blade exhibiting an overturning peak and a blade turning angle beta, wherein, for each blade, the blade turning angle minimizes blade loading and is adjusted from the overturning peak to the exit angle at the trailing edge according to one of the following equations:

$$\text{Beta}=1E\text{-}07x^5-3E\text{-}05x^4+0.0017x^3-0.0252x^2+0.3766x-61.41, \text{ or}$$

$$\text{Beta}=2E\text{-}09x^6-5E\text{-}07x^5+4E\text{-}05x^4-0.0018x^3+0.0523x^2-0.2439x-60.66.$$

10. The impeller according to claim 9, wherein an adjustment of the blade turning angle is made over half an overturning length within a range of 25%<C/L<50%.

11. The impeller according to claim 9, wherein the blade turning angle is decreased from the overturning peak at around 60-65% M to the trailing edge with a significant Beta angle decrease from the overturning point to about 90% M and a flattening of the Beta angle from about 90% M to the trailing edge, wherein M is a meridional length of each of the blades.

12. The impeller according to claim 9, wherein the blade turning angle falls below the exit angle.

13. The impeller according to claim 9, wherein the blade turning angle falls below the exit angle by about five degrees.

14. The impeller according to claim 9, wherein the blade turning angle is decreased from the overturning peak at around 60-65% M to the trailing edge with a significant Beta angle decrease from the overturning point to about 90% M, where the Beta angle is less than the exit Beta angle by about 5 degrees, and an increase of the Beta angle from about 90% M to the trailing edge, wherein M is a meridional length of each of the blades.

15. An impeller of an aircraft gas turbine engine, the impeller comprising: a hub; blades; and a shroud surrounding the hub and the blades to form a flow path from an inducer portion at an upstream side of the impeller to an exducer portion at an impeller exit, the blades comprise main blades and splitter blades interposed between neighboring main blades, each of the main blades and each of the splitter blades comprising: a leading edge; and a trailing edge with an exit angle at the impeller exit, and each of the main blades and each of the splitter blades exhibiting an overturning peak and a blade turning angle beta, wherein, for each of the main blades and for each of the splitter blades, the blade turning angle minimizes blade loading and is adjusted rapidly from the overturning peak to the exit angle at the trailing edge according to one of the following equations:

$$\text{Beta}=1E\text{-}07x^5-3E\text{-}05x^4+0.0017x^3-0.0252x^2+0.3766x-61.41, \text{ or}$$

$$\text{Beta}=2E\text{-}09x^6-5E\text{-}07x^5+4E\text{-}05x^4-0.0018x^3+0.0523x^2-0.2439x-60.66.$$

16. The impeller according to claim 15, wherein an adjustment of the blade turning angle is made over half an overturning length within a range of 25%<C/L<50%.

17. The impeller according to claim 15, wherein the blade turning angle is decreased from the overturning peak at around 60-65% M to the trailing edge with a significant Beta angle decrease from the overturning point to about 90% M and a flattening of the Beta angle from about 90% M to the trailing edge, wherein M is a meridional length of each of the main blades and each of the splitter blades.

18. The impeller according to claim 15, wherein the blade turning angle falls below the exit angle.

19. The impeller according to claim 15, wherein the blade turning angle falls below the exit angle by about five degrees.

20. The impeller according to claim 15, wherein the blade turning angle is decreased from the overturning peak at around 60-65% M to the trailing edge with a significant Beta angle decrease from the overturning point to about 90% M, where the Beta angle is less than the exit Beta angle by about 5 degrees, and an increase of the Beta angle from about 90% M to the trailing edge, wherein M is a meridional length of each of the main blades and each of the splitter blades.

* * * * *